US012771189B2

(12) United States Patent
Hong et al.

(10) Patent No.: US 12,771,189 B2
(45) Date of Patent: Oct. 20, 2026

(54) STATOR FOR AXIAL FLUX MOTOR AND METHOD FOR MANUFACTURING THE SAME

(71) Applicants: Hyundai Motor Company, Seoul (KR); Kia Corporation, Seoul (KR)

(72) Inventors: Hyun Seok Hong, Seoul (KR); Hyun Woo Jun, Seoul (KR); Hee Kwang Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 416 days.

(21) Appl. No.: 18/122,115

(22) Filed: Mar. 15, 2023

(65) Prior Publication Data

US 2024/0128810 A1 Apr. 18, 2024

(30) Foreign Application Priority Data

Oct. 12, 2022 (KR) ........................ 10-2022-0130807

(51) Int. Cl.
*H02K 1/18* (2006.01)
*H02K 1/14* (2006.01)

(52) U.S. Cl.
CPC ............. *H02K 1/182* (2013.01); *H02K 1/148* (2013.01); *H02K 2203/12* (2013.01)

(58) Field of Classification Search
CPC .... H02K 1/182; H02K 1/148; H02K 2203/12; H02K 3/522; H02K 1/06; H02K 3/46; H02K 15/02
See application file for complete search history.

(56) References Cited

U.S. PATENT DOCUMENTS

| | | | | |
|---|---|---|---|---|
| 10,630,120 | B2 | 4/2020 | Sakai et al. | |
| 2004/0245878 | A1 | 12/2004 | Kim et al. | |
| 2012/0126653 | A1* | 5/2012 | Yang | H02K 1/146 310/156.32 |
| 2013/0264894 | A1 | 10/2013 | Kim | |
| 2014/0184014 | A1 | 7/2014 | Kim et al. | |
| 2014/0285048 | A1 | 9/2014 | Seo et al. | |
| 2014/0292117 | A1* | 10/2014 | Lee | H02K 5/203 310/54 |
| 2016/0214291 | A1 | 7/2016 | Naruse et al. | |
| 2017/0155297 | A1* | 6/2017 | Tokoi | H02K 21/24 |
| 2018/0254680 | A1* | 9/2018 | Sakurai | H02K 21/24 |

FOREIGN PATENT DOCUMENTS

| | | | |
|---|---|---|---|
| CN | 112072820 | A | 12/2020 |
| JP | 2010148308 | A * | 7/2010 |
| JP | 2015-50428 | A | 1/2015 |
| KR | 10-2004-0002349 | A | 1/2004 |

(Continued)

OTHER PUBLICATIONS

Translation of JP 2010148308 A (Year: 2024).*

*Primary Examiner* — Christopher M Koehler
*Assistant Examiner* — Riley Owen Stout
(74) *Attorney, Agent, or Firm* — Banner & Witcoff, Ltd.

(57) ABSTRACT

Disclosed are an easily manufacturable stator for an axial flux motor, and a method of manufacturing the same. A stator includes a core, a bobbin having a hollow portion into which the core is inserted, and a winding wound around the bobbin. A radial outer corner portion of the core is formed to have a cross-sectional shape bent at least twice.

9 Claims, 5 Drawing Sheets

(56) References Cited

FOREIGN PATENT DOCUMENTS

| | | | |
|---|---|---|---|
| KR | 10-2012-0065951 | A | 6/2012 |
| KR | 10-2014-0087365 | A | 7/2014 |
| KR | 101492172 | B1 | 2/2015 |
| KR | 10-2021-0059136 | A | 5/2021 |
| KR | 102413796 | B1 | 6/2022 |

* cited by examiner

| | | CURRENT DENSITY [$A_{ph\_rms}/mm^2$] | PHASE CURRENT [$A_{ph\_pk}/A_{ph\_rms}$] | TORQUE [Nm] | RIPPLE FACTOR [%] |
|---|---|---|---|---|---|
|  | EXISTING SHAPE (ACUTE ANGLE, 80 DEGREES) | 22.73 | 254.59 / 180.02 | 401.13 | 0.90 |
|  | PLAN A (RIGHT ANGLE + OBTUSE ANGLE) | 22.77 | 255.04 / 180.34 | 401.23 | 0.85 |
|  | PLAN B (OBTUSE ANGLE + OBTUSE ANGLE) | 22.86 | 256.05 / 181.05 | 401.14 | 0.86 |
|  | PLAN C (OBTUSE ANGLE + OBTUSE ANGLE + OBTUSE ANGLE) | 22.83 | 255.71 / 180.81 | 401.16 | 0.92 |

STATOR FOR AXIAL FLUX MOTOR AND METHOD FOR MANUFACTURING THE SAME

CROSS-REFERENCE TO RELATED APPLICATION(S)

This application claims benefit of priority to Korean Patent Application No. 10-2022-0130807 filed on Oct. 12, 2022 in the Korean Intellectual Property Office, the disclosure of which is incorporated herein by reference in its entirety.

TECHNICAL FIELD

The present disclosure relates to an easily manufacturable stator for an axial flux motor, and a method of manufacturing the same.

BACKGROUND

Motors may be classified as radial flux motors and axial flux motors according to a direction of magnetic flux therein. In an axial flux motor, a stator and a core of a rotor are spaced apart from each other such that a predetermined air gap is formed in an axial direction. Such an axial flux motor rotates a shaft of the motor using attractive force and repulsive force generated by the magnetic flux generated in the stator and the magnetic flux of a magnet attached to the rotor.

An electric vehicle uses an environmentally friendly electric motor, which is a key component in influencing overall vehicle performance. With the development of power semiconductor technology, there is demand for high-voltage motors having appropriately high speed, high torque, and high-power density.

Axial flux motors may have properties such as high torque and high power, as compared to radial flux motors of the comparable size, such that axial flux motors may be advantageous for reductions in size and weight. It may be relatively difficult to manufacture an axial flux motor, as compared to a radial flux motor. In particular, in manufacturing a stator to which a prismatic winding is used for a motor having high voltage, high torque, and high power, the prismatic winding may not be densely wound to be in close contact with the stator within a limited slot area, which may result in lifting.

SUMMARY

The following summary presents a simplified summary of certain features. The summary is not an extensive overview and is not intended to identify key or critical elements.

Systems, apparatuses, and methods are described for a stator assembly and assembly thereof. A stator may comprise a core having a bar shape, a bobbin forming a hollow portion into which the core is inserted, and a winding wound around the bobbin. The core comprises a first radial outer corner portion that has a cross-sectional shape comprising at least two bends.

Also, or alternatively, a stator may comprise a core formed to have a bar shape, a bobbin comprising an inner surface that forms a hollow portion into which the core is inserted, and a winding wound around the bobbin. A first radial outer corner portion of the core may include a curved portion.

These and other features and advantages are described in greater detail below.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
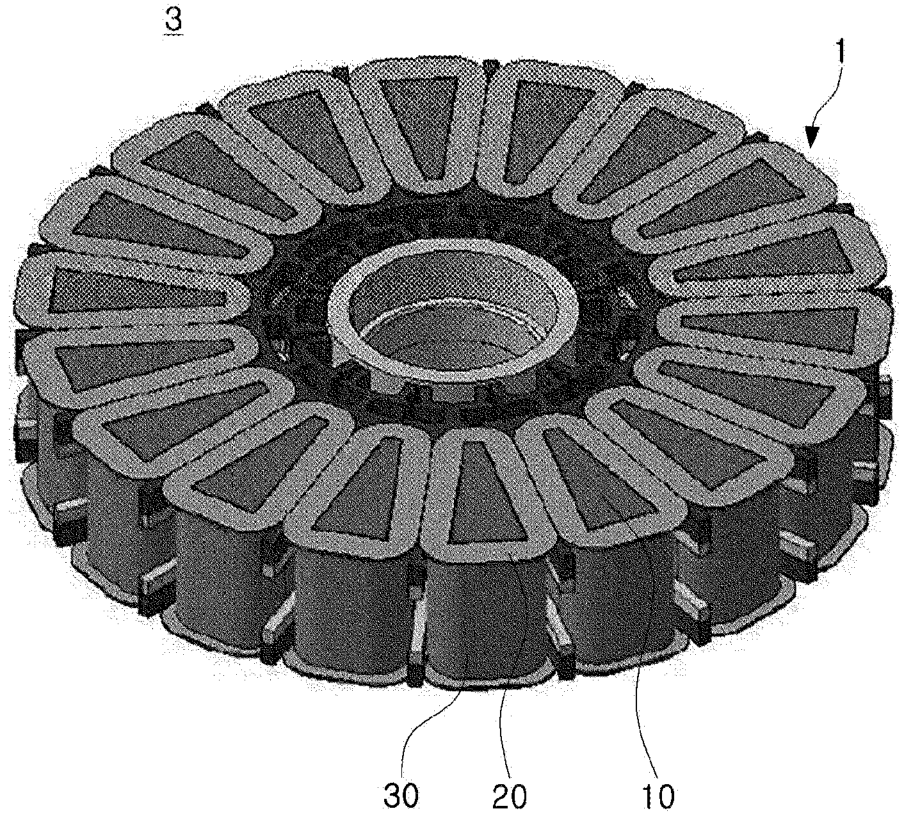
FIG. 1 is a perspective view of a stator assembly for an axial flux motor.

Hereinafter, the present disclosure will be described in detail with reference to exemplary drawings. In adding reference numerals to components of each drawing, it should be noted that the same components are indicated by the same numerals even though displayed on different drawings.

FIG. 1 is a perspective view of a stator assembly applied to an axial flux motor.

First, an axial flux motor may comprise a stator assembly 3 configured to generate magnetic flux to form a rotating field, and a rotor assembly (not illustrated) comprising a magnetic body configured to interact with the rotating field, such that the rotor assembly is driven in rotation.

The axial flux motor may comprise a housing (not illustrated) accommodating the stator assembly 3 and the rotor assembly.

The stator assembly 3 may include a plurality of stators 1, and each stator may include a core 10, a bobbin 20 and a winding 30. The plurality of stators may be arranged in a circular ring (e.g., within the housing) to form the stator assembly.

The core 10 may be inserted into and fixed to the bobbin 20, and the bobbin may support the winding 30. The core 10 may provide a path for magnetic flux generated by interaction between the stator assembly 3 and the rotor assembly.

The winding 30 may be wound around the bobbin 20 and may be connected to a power source to receive current, thereby generating magnetic flux interacting with the rotor assembly.

The rotor assembly may comprise a shaft, a rotating plate, a rotor core, and a magnetic body. The shaft may pass through the stator assembly 3 to be rotatably mounted within the housing. A pair of rotating plates may be disposed on the shaft to oppose each other with the stator assembly interposed therebetween.

The rotor core may be mounted on the rotating plate to support the magnetic body configured to generate rotational force, and the magnetic body may interact with the rotating field formed through the winding 30 when a current is applied to generate rotational force. Such rotational force may be transmitted to the shaft through the rotating plate rotating the shaft.

In the axial flux motor, magnetic flux generated in the stator assembly 3 may be generated in a longitudinal direction of the shaft. The magnetic flux generated in the longitudinal direction of the shaft may interact with rotor assemblies disposed on opposite sides of the stator assembly, thereby generating rotational force. Accordingly, the rotor assembly and the shaft may be driven in rotation.

The axial flux motor may generate high torque, as compared to a radial flux motor having the same volume and/or weight. In other words, the axial flux motor may have excellent performance in terms of torque per unit volume and/or unit weight, as compared to the radial flux motor.

Accordingly, the axial flux motor may reduce a size and weight of a device for providing required torque (e.g., for a vehicle), as compared to the radial flux motor, which may allow for implementing a small-sized and high-power driving means in a device to be driven (e.g., a vehicle).

Figure 2:
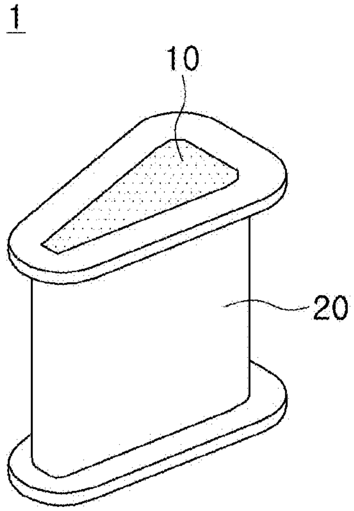
FIG. 2 is a perspective view of a stator for an axial flux motor in which a winding is omitted according to an example of the present disclosure.
Figure 3:
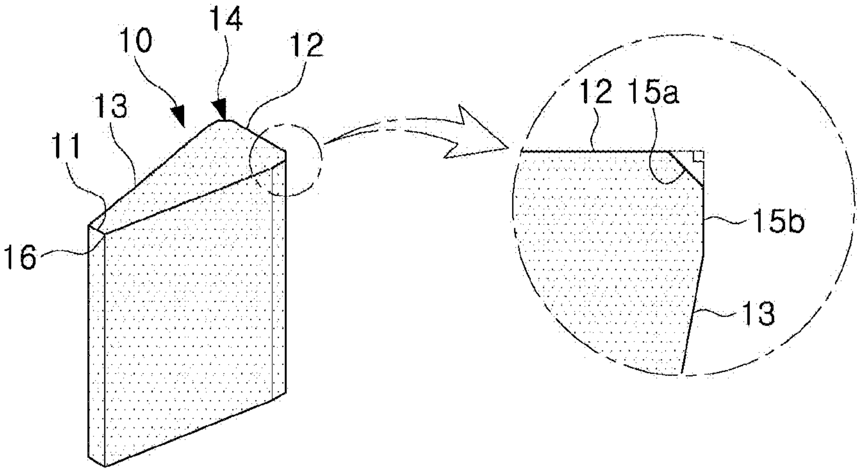
FIG. 3 is a perspective view and an enlarged view of a core.
Figure 4:
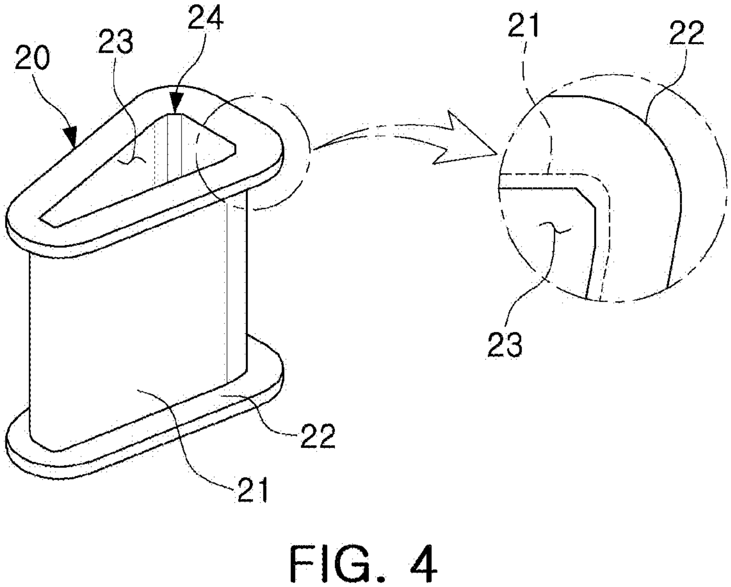
FIG. 4 is a perspective view and an enlarged view of a bobbin.

FIG. 2 is a perspective view of a stator 1 for an axial flux motor according to an example of the present disclosure. In FIG. 2, the winding is omitted for visualizing the stator components of a core 10 and a bobbin 20. FIG. 3 is a perspective view and an enlarged view of the core 10. FIG. 4 is a perspective view and an enlarged view of the bobbin 20.

Figure 6:
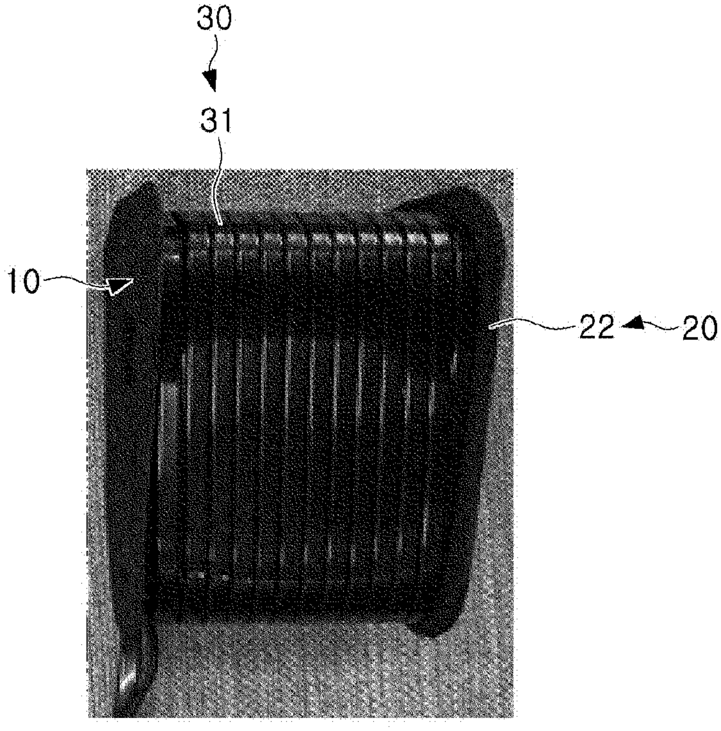
FIG. 6 is a photograph illustrating a state in which a winding is wound around a core and a bobbin of a stator for an axial flux motor according to the present disclosure.

The stator 1 for an axial flux motor according to an example of the present disclosure may include the core 10, the bobbin 20, and the winding 30 (see, e.g., FIG. 6).

The core 10 may have a substantially trapezoidal cross-section, and may be in the form of a simple bar (e.g., with a substantially convex cross-section, without, for example, a shoe shape, a notch shape, etc.). In the core, a shorter opposite side 11 among a pair of opposite (e.g., parallel) sides of the substantially trapezoidal cross-section may be arranged radially inwards with respect to where the shaft would be inserted. In other words, the core may be formed to have a width becoming narrower radially inwards when the core is arranged in the stator assembly having a radial arrangement. Such a configuration may allow the plurality of stators 1 to be arranged to have a ring shape in a circumferential direction of the stator assembly. The number of cores and stators may be changed, as desired and/or as necessary.

Figure 7:
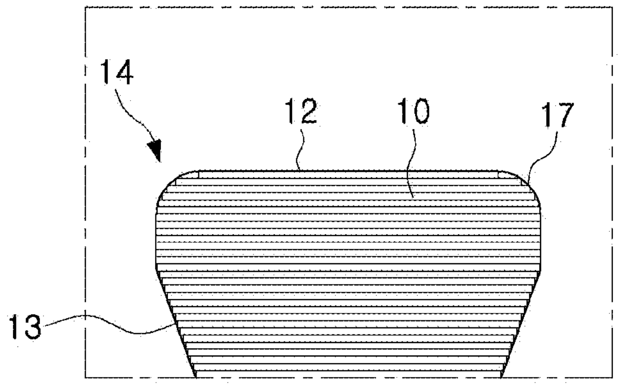
FIG. 7 is a diagram illustrating a core of a stator for an axial flux motor according to another example of the present disclosure.

For example, the core 10 may be formed by stacking a plurality of electrical steel sheets. Specifically, the core 10 may be formed by stacking a plurality of steel sheet sets, and each steel sheet set may be formed by stacking a predetermined number (e.g., 1, 2, 3, etc.) of electrical steel sheets having the same width (in a direction perpendicular to the stacking direction). The stacking direction may be a direction that will be a radial direction when the core 10 assembled as described is arranged in a stator assembly (e.g., as in FIG. 1). An example of such a stacking configuration is illustrated in FIG. 7. Manufacturing a core by stacking the steel sheet sets as described above may avoid the need for additional molds to form the core 10.

Also, or alternatively, the core 10 may be formed through another process, such as a cutting process or a molding process. For example, the core 10 may be formed by compression molding performed by pressing a moldable material. The compression molding may also comprise heating the moldable material. One such material may be soft magnetic powder particles. The soft magnetic powder particles may be based on iron-based particles, and each soft magnetic powder particle may be coated to be electrically insulated. The soft magnetic powder particles may be combined with a binder or the like to be compressed together therewith.

Since various techniques for forming a core through compression molding of soft magnetic powder particles are already known, a detailed description thereof is omitted herein.

However, in order to form a core 10 with a corner portion having a shape that will be described below, a mold having a corresponding shape may be used for compression molding. Manufacturing the core 10 by stacking a plurality of electrical steel sheets may allow for greater flexibility in forming the core 10 in a desired shape in various and precise manners.

The bobbin 20, a component for electrical insulation of the core 10, may be coupled to the core 10, and may support the winding 30. Specifically, the bobbin may include a body 21 and a flange 22.

The body 21 may be coupled to the core 10 to surround a side surface of the core 10. A hollow portion 23 for insertion of the core 10 may be provided within the body 21. The hollow portion 23 may be formed to pass through the body 21 in a longitudinal direction of the body 21. The hollow portion 23 may have a cross-section corresponding to a cross-sectional shape of the core 10 (e.g., substantially trapezoidal).

The core 10 may be inserted into and/or accommodated in the hollow portion 23 of the bobbin 20, and accordingly the perimeter of the side surface of the core 10 may be surrounded by the body 21. The core 10 and the bobbin 20 may be fixedly coupled to each other by bonding (e.g., using an adhesive). End surfaces of the core 10 may be exposed at opposite ends of the bobbin 20.

The flanges 22 may be integrally molded and provided at opposite ends of the body 21. The flange 22 may be formed to have a substantially trapezoidal and/or sectoral shape.

One edge of the flange 22 may be connected to and/or may be in contact with a flange of another adjacent bobbin when the bobbins are assembled in the stator assembly 3. The plurality of bobbins 20 may be continuously arranged in a circumferential direction to generally form a ring shape. Thus, the plurality of stators 1 may be arranged to form a ring shape in a circumferential direction (see, e.g., FIG. 1) when assembled in the stator assembly 3.

The bobbin 20 may be formed of an insulating material having ensured rigidity and heat resistance. For example, high-strength and heat-resistant plastics such as polyetheretherketone (PEEK), polyphenylene sulfide (PPS), and polyphthalamide (PPA) may be used.

The winding 30 may be wound around and supported by the bobbin 20. The winding 30 may be wound along a perimeter of a side surface of the bobbin 20. The winding 30 may generate magnetic flux flow when current is applied. For example, multiphase current may be applied to the winding 30. To this end, a plurality of terminals may be provided.

As the winding 30, a circular winding (e.g., a wire having a circular cross-sectional shape) or a prismatic winding (e.g., a wire having a prismatic cross-sectional shape may be adopted). Here, the cross-sectional shape of the prismatic winding wire may have at least one side including a straight line.

Due to the circular cross-sectional shape of the circular winding, dead space may be formed between windings forming successive turns. Magnetomotive force of a motor may be proportional to the number of turns of a winding, such that reducing the dead space and/or increasing the number of turns of the winding me enable generation of a higher magnetomotive force for each stator, which may allow for a high-power motor having a reduced size.

As a means for reducing the dead space, the prismatic winding 31 may be wound around the core 10 and the bobbin 20. The prismatic winding may have a cross-section to reduce and/or minimize dead space between successive windings, thereby increasing a space factor of the winding (ratio of windings per slot space). This may increase power production capabilities of the motor for its size. In addition, a size of the motor to generate a given torque may be reduced.

Accordingly, the prismatic winding 31 may enable implementation of a high-power and small-sized motor, as compared to the circular winding. However, in the prismatic winding, it may be difficult to perform a winding operation, e.g., as compared to the circular winding. When the prismatic winding is wound, the prismatic winding may be lifted due to shapes of corner portions of the core 10 and/or the bobbin 20 (e.g., depending on an angle of corner portions of the core 10 and/or the bobbin 20), which may result in formation of dead space.

The difficulty in winding and the occurrence of dead space due to lifting make it difficult to use the prismatic winding 31, despite the various advantages of the prismatic winding 31.

The stator 1 of the present disclosure may increase manufacturability, even when the prismatic winding is applied, while excellent performance of the axial flux motor is maintained.

Figure 5:
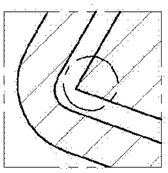
FIG. 5 is a table illustrating a performance analysis result for each corner portion shape.
Figure 5:
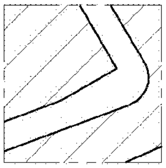
Figure 5:
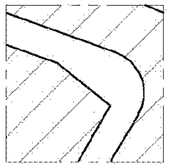
Figure 5:
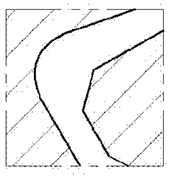

As illustrated in the enlarged views of FIGS. 3 and 4 and the table of FIG. 5, in the stator 1 for an axial flux motor according to the present disclosure, a radial outer corner portion 14 of the core 10 and a radial outer corner portion 24 of an inner surface of the bobbin 20 may be formed to have a shape bent at least twice.

Here, the radial outer corner portion 14 of the core 10 and the radial outer corner portion 24 of the inner surface of the bobbin 20 may have shapes corresponding to each other. Thus, the following description will be given using the radial outer corner portion of the core as a reference, but should be understood to correspondingly describe a radial inner corner portion of the bobbin 20.

As described above, since the core 10 and the hollow portion 23 of the bobbin 20 have a substantially trapezoidal cross-section, if the radial outer corner portion of core has a shape bent only once, it will be bent at an acute angle (see, e.g., FIG. 5, top row, "Existing shape"). This may cause the corner portions of the core 10 and the bobbin 20 to have a sharply bent shape, such that the prismatic winding 31 may be lifted when the prismatic winding 31 is wound around the core and the bobbin, particularly at the sharp (e.g., acute, angles), resulting in formation of dead space.

In order to resolve such an issue, in the stator 1 for an axial flux motor according to the present disclosure, the radial outer corner portion 14 of the core 10 may be formed to have a shape bent at least twice at a right angle and/or at an obtuse angle.

For example, in the trapezoidal cross-section of the core 10 (e.g., in FIG. 3), a longer opposite side 12 among a pair of parallel opposite sides may be arranged radially outwards with respect to the shaft. The corner portion consisting of the longer opposite side 12 and one oblique side 13 may first be bent at a right angle with respect to the opposite side to form a connection side, and then may be bent at an obtuse angle to the connection side to extend to the oblique side (see plan A in FIG. 5).

Also, or alternatively, the corner portion 14 consisting of the longer opposite side 12 and the one oblique side 13 may first be bent at an obtuse angle with respect to the opposite side to form a connection side, and then may be bent at a right angle or at an obtuse angle with respect to the connection side to extend to the oblique side (see plan B in FIG. 5).

Also, or alternatively, the corner portion consisting of the longer opposite side 12 and the one oblique side 13 may first be bent at an obtuse angle with respect to the opposite side to form a first connection side 15*a*, then may be bent at an obtuse angle with respect to the first connection side 15*a* to form a second connection side 15*b*, and then may be bent at an obtuse angle with respect to the second connection side 15*b* to extend to the oblique side 13 (see FIGS. 3, 4, and plan C in FIG. 5). In this case, the second connection side 15*b* is perpendicular to the opposite side.

For reference, a radially inner corner portion 16 of the core 10, that is, a corner portion consisting of a shorter opposite side 11 and one oblique side 13 among a pair of parallel opposite sides may have a shape bent at an obtuse angle.

In addition, when the core 10 is formed by stacking a plurality of steel sheet sets, the connection side may be defined as a virtual straight line connecting vertices of each steel sheet set to each other.

FIG. 5 is a table illustrating a computational performance analysis result for each corner portion shape. The table of FIG. 5 indicates that there is no significant difference in terms of performance between an axial flux motor to which the stator 1 according to the present disclosure is applied and an axial flux motor to which a stator having an existing corner portion shape is applied.

In the table of FIG. 5, a ripple factor is a value expressed as a percentage of a degree of ripple in an average value of an output torque waveform of a motor comprising the indicated stator. One of the causes of torque ripple is geometric shapes of a magnetic body (e.g., of the rotor assembly) and a stator slot of the motor. The smaller the value of the ripple factor, the better. The performance analysis of FIG. 5 was performed with a commercial program using a finite element method.

In the stator 1 for an axial flux motor according to the present disclosure, when the prismatic winding 31 is wound around the core 10 and the bobbin 20 of the stator, the prismatic winding may be densely wound without lifting.

FIG. 6 is a photograph illustrating a state in which a winding is wound around a core and a bobbin of a stator for an axial flux motor according to the present disclosure.

As described above, a shape of the radial outer corner portion 14 of the core 10 may be changed and/or selected such that the prismatic winding 31 may be uniformly and closely wound around the core 10 and the bobbin 20, thereby alleviating difficulties in winding, and reducing dead space, so as to increase a space factor. Accordingly, a motor having high power and high efficiency may be provided.

The stator 1 of the present disclosure enables ease of manufacturing with excellent performance of an axial flux motor comprising said stator 1. The stator 1 avoids problems of existing axial flux motors, thereby allowing the axial flux motor to have a reduced size and weight, as compared to radial flux motors with similar capabilities, and reducing manufacturing costs through simplified configuration, reduced need for specialized equipment, and reduced manufacturing time.

FIG. 7 is a diagram illustrating a core of a stator for an axial flux motor according to another example of the present disclosure.

The example illustrated in FIG. 7 may be different from the above-described example only in terms of the corner portion 14 having a curved shape at least partially, and may be the same as the above-described example in terms of remaining components.

Specifically, in the stator 1 for an axial flux motor according to the present disclosure, the radial outer corner portion 14 of the core 10 and the radial outer corner portion 24 of the inner surface of the bobbin 20 may include a curved portion 17 being.

For example, in the trapezoidal cross-section of the core 10, the corner portion 14 may consist of the longer opposite side 12 and the one oblique side 13 among a pair of parallel opposite sides. The opposite side and the oblique side may be connected to each other by a curve to have a curved shape at least partially.

As illustrated in FIG. 7, when the core 10 is formed by radially stacking a plurality of steel sheet sets, the curve may be defined as a virtual curve connecting vertices of each steel sheet set to each other. The curve may have a predetermined curvature.

However, the present disclosure is not necessarily limited thereto, and the curved portion 17 may be formed as a curved surface by, e.g., a cutting process or molding process.

In addition, each corner portion of an outer surface of the bobbin 20 may be formed as a curved surface having a predetermined curvature.

Figure 8:
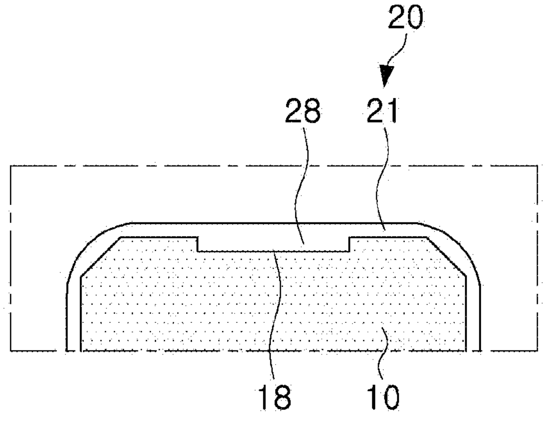
FIG. 8 is a diagram illustrating portions of a core and a bobbin of a stator for an axial flux motor according to another example of the present disclosure.

FIG. 8 is a diagram illustrating portions of a core and a bobbin of a stator for an axial flux motor according to another example of the present disclosure.

The example illustrated in FIG. 8 may be different from the above-described example only in terms of only key coupling between the core 10 and the bobbin 20, and may be the same as the above-described example in terms of remaining components.

In the stator 1 for an axial flux motor according to the present disclosure, a key groove 18 may be formed on one side surface of the core 10, and a key-shaped portion 28 corresponding to the key groove may be formed on an inner surface of the bobbin 20.

The key groove 18 may be formed to be recessed from the one side surface of the core 10 to a predetermined depth. The key groove may be formed to extend to have a predetermined length, parallel to an insertion direction in which the core 10 is inserted into the bobbin 20.

The key-shaped portion 28 may be formed on an inner surface of the body 21 of the bobbin 20 to protrude toward the hollow portion 23 of the body in a position corresponding to that of the key groove 18. The key-shaped portion may also be formed to have a predetermined length, parallel to the insertion direction.

Here, the key groove 18 may be shaped and configured to accept and/or accommodate the key-shaped portion 28. For example, the key groove may be formed on the inner surface of the bobbin 20, and the key-shaped portion may be formed on the core 10.

The key-shaped portion 28 may be inserted into the key groove 18, thereby allowing the core 10 and the bobbin 20 to be more firmly and/or stably coupled to each other.

As described above, the core 10 and the bobbin 20 may be fixedly coupled to each other by, for example, bonding using an adhesive. However, since the key groove 18 and the key-shaped portion 28 are added, a shear load may be more stably endured.

For more firm coupling between the core 10 and the bobbin 20, the bobbin may be formed of a material capable of being heat-shrunk at high temperature, such as polyolefin-based resin.

In addition, for more firm coupling between the core 10 and the bobbin 20, an adhesive material capable of being heat-shrunk at high temperature may be interposed between the core and the bobbin.

Hereinafter, a method of manufacturing a stator 1 for an axial flux motor according to the present disclosure will be briefly described.

A method of manufacturing a stator 1 for an axial flux motor according to an example of the present disclosure may include preparing the core 10 formed by stacking electrical steel sheets, preparing the bobbin 20 having the hollow portion 23, insertedly fixing the core to the bobbin, and winding the winding 30 around the bobbin.

In the preparing the core 10, a plurality of steel sheet sets may be formed by grouping and stacking electrical steel sheets into several groups having the same width, and then sequentially stacking a plurality of steel sheet sets having different widths, thereby forming the core 10.

Such a method may use only the number of molds corresponding to the number of steel sheet sets, the number of molds may be reduced, as compared to a method in which one mold is required for each electrical steel sheet. Additionally, this method avoids a specialized mold for the entire core 10.

In addition, in the preparing the core 10, the radial outer corner portion 14 of the core formed from steel sheets cut and processed to form a cross-sectional shape of the radial outer core portion 14 of the core that is bent at least twice and/or comprises a curved portion 17 at least partially.

For a cutting process of the corner portion 14, a wire cutting method may be used, but the present disclosure is not necessarily limited thereto.

In the preparing the bobbin 20, a molding process may be used for manufacturing, but the present disclosure is not necessarily limited thereto. For example, molten resin may be injected into a mold having a shape portion corresponding to those of the hollow portion 23, the corner portion 24, and the flange 22, and the injected resin may be cured or solidified, thereby molding the bobbin in which the body 21 and flange 22 are integrally formed.

The radial outer corner portion 24 of the inner surface of the bobbin 20 may be molded to have a cross-sectional shape bent at least twice, or the radial outer corner portion of the inner surface may be molded to have a curved portion at least partially.

Subsequently, the core 10 may be inserted into the bobbin 20 and assembled, and the winding 30, such as the prismatic winding 31, may be wound around the assembled core and bobbin to complete the stator 1.

The core 10 and the bobbin 20 may be fixedly coupled to each other by, for example, bonding using an adhesive. In addition, the key groove 18 and the key-shaped portion 28 may be added between the core 10 and the bobbin 20.

A method of manufacturing a stator 1 for an axial flux motor according to another example of the present disclosure may include preparing the molded core 10 by molding, e.g., by pressing soft magnetic powder particles, preparing the bobbin 20 having the hollow portion 23, insertedly fixing the core to the bobbin, and winding the winding 30 around the bobbin.

In the preparing the core 10, soft magnetic powder particles and a binder may be put into a mold having a shape portion corresponding to that of the core 10, in particular a corner portion, and then may be pressurized (and, optionally, heated), thereby precisely molding the core 10 having a desired shape.

The radial outer corner portion 14 of the core 10 may be molded to have a cross-sectional shape bent at least twice, or the radial outer corner portion of the core may be molded to have the curved portion 17, at least partially.

In the preparing the bobbin 20, molten resin may be injected into a mold having a shape portion corresponding to those of the hollow portion 23, the corner portion 24, and the flange 22, and the injected resin may be cured or solidified, thereby molding the bobbin 20 in which the body 21 and flange 22 are integrally formed.

The radial outer corner portion 24 of the inner surface of the bobbin 20 may be molded to have a cross-sectional shape bent at least twice, or the radial outer corner portion of the inner surface may be molded to have a curved portion at least partially.

Subsequently, the core 10 may be inserted into the bobbin 20 and assembled, and the winding 30 such as the prismatic winding 31 may be wound around the assembled core and bobbin to complete the stator 1.

The core 10 and the bobbin 20 may be fixedly coupled to each other by, for example, bonding using an adhesive. In addition, the key groove 18 and the key-shaped portion 28 may be added between the core and the bobbin.

As described above, according to the present disclosure, a core 10 and a bobbin 20 have a shape allowing a winding 30 to be easily and flushly wound, such that a stator 1 may be easily manufactured while excellent performance of an axial flux motor is achieved.

In addition, according to the present disclosure, a prismatic winding 31 may be uniformly and closely wound around a core 10 and a bobbin 20 to increase a space factor, thereby reducing a size of a motor while reducing manufacturing costs.

An aspect of the present disclosure provides an easily manufacturable stator for an axial flux motor capable of maintaining excellent performance of the axial flux motor, and a method of manufacturing the same.

According to an aspect of the present disclosure, there is provided a stator including a core formed to have a bar shape, a bobbin having a hollow portion into which the core is inserted, and a winding wound around the bobbin. A radial outer corner portion of the core may be formed to have a cross-sectional shape bent at least twice.

A radial outer corner portion of an inner surface of the bobbin may be formed to have a cross-sectional shape bent at least twice.

The corner portion may have a shape bent at least twice at a right angle or at an obtuse angle.

The corner portion may have a longer opposite side and one oblique side among a pair of parallel opposite sides. The corner portion may be bent at a right angle with respect to the longer opposite side to form a connection side, and then may be bent at an obtuse angle with respect to the connection side to extend to the one oblique side.

The corner portion may have a longer opposite side and one oblique side among a pair of parallel opposite sides. The corner portion may be bent at an obtuse angle with respect to the longer opposite side to form a connection side, and then is bent at a right angle or at an obtuse angle with respect to the connection side to extend to the one oblique side.

The corner portion may have a longer opposite side and one oblique side among a pair of parallel opposite sides. The corner portion may be bent at an obtuse angle with respect to the longer opposite side to form a first connection side, then is bent at an obtuse angle with respect to the first connection side to form a second connection side, and then is bent at an obtuse angle with respect to the second connection side to extend to the one oblique side.

The second connection side may be perpendicular to the longer opposite side.

According to another aspect of the present disclosure, there is provided a stator including a core formed to have a bar shape, a bobbin having a hollow portion into which the core is inserted, and a winding wound around the bobbin. A radial outer corner portion of the core may include a bent portion formed at least partially.

A radial outer corner portion of an inner surface of the bobbin may include an at least partially formed curved portion.

The winding may be a prismatic winding, and a cross-sectional shape of the prismatic winding may have at least one side including a straight line.

The stator may include a key groove formed in one side surface of the core, and a key-shaped portion formed to correspond to the key on an inner surface of the bobbin. The key-shaped portion may be inserted into the key groove.

While example embodiments have been shown and described above, it will be apparent to those skilled in the art that modifications and variations could be made without departing from the scope of the present disclosure as defined by the appended claims.

For example, the above-mentioned and illustrated examples of the present disclosure may be combined with each other, and each example may selectively adopt or replace some components with those of other examples, as necessary and/or as desired.

What is claimed is:

1. A stator comprising:

a core having a bar shape;

a bobbin forming a hollow portion into which the core is inserted; and a winding wound around the bobbin, wherein the core comprises a first radial outer corner portion that has a cross-sectional shape comprising at least two bends, wherein an insulating portion of the bobbin has a second radial outer corner portion of an inner surface that has a cross-sectional shape comprising at least two bends, wherein one side surface of the core forms a key groove, wherein an inner surface of the bobbin comprises a key-shaped protrusion corresponding to the key groove, wherein the key-shaped protrusion is inserted into the key groove, wherein each of the radial outer corner portions connects a longer opposite side, of a pair of parallel opposite sides, and one oblique side that connects to a shorter opposite side of the pair of parallel opposite sides, wherein each of the radial outer corner portions comprises a first obtuse angle bend between the longer opposite side and one connection side, and a second obtuse angle bend between the one connection side and the one oblique side, and wherein each of a radial inner corner portion of the core and a radial inner corner portion of the bobbin has a shape bent at an obtuse angle between the shorter opposite side and the one oblique side.

2. The stator of claim 1, wherein the winding is a prismatic winding, and a cross-sectional shape of the prismatic winding comprises at least one straight side.

3. The stator of claim 1, wherein:

the second radial outer corner portion connects a longer opposite side, of a pair of parallel opposite sides of the bobbin, and one oblique side, of the bobbin, that connects to a shorter opposite side of the pair of parallel opposite sides of the bobbin, and the key-shaped protrusion is formed on the longer opposite side of the bobbin.

4. The stator of claim 1, wherein:

the first radial outer corner portion connects a longer opposite side, of a pair of parallel opposite sides of the core, and one oblique side, of the core, that connects to a shorter opposite side of the pair of parallel opposite sides of the core, and the key groove is formed on the longer opposite side of the core.

5. The stator of claim 1, wherein the first obtuse angle is greater than the second obtuse angle.

6. A stator comprising:

a core having a bar shape;

an insulator forming a hollow portion into which the core is inserted; and a winding wound around the insulator, wherein the core comprises a first radial outer corner portion that has a cross-sectional shape comprising at least two bends, wherein the insulator has a second radial outer corner portion of an inner surface that has a cross-sectional shape comprising at least two bends, wherein one side surface of the core forms a key-shaped protrusion, wherein the inner surface of the insulator comprises a key groove corresponding to the key-shaped protrusion, wherein the key-shaped protrusion is inserted into the key groove, wherein each of the radial outer corner portions connects a longer opposite side, of a pair of parallel opposite sides, and one oblique side that connects to a shorter opposite side of the pair of parallel opposite sides, wherein each of the radial outer corner portions comprises a first obtuse angle bend between the longer opposite side and one connection side, and a second obtuse angle bend between the one connection side and the one oblique side, and wherein each of a radial inner corner portion of the core and a radial inner corner portion of the insulator has a shape bent at an obtuse angle between the shorter opposite side and the one oblique side.

7. The stator of claim 6, wherein the winding is a prismatic winding, and a cross-sectional shape of the prismatic winding comprises at least one straight side.

8. The stator of claim 6, wherein:

the key-shaped protrusion is formed on the longer opposite side of the core, and the key groove is formed on the longer opposite side of the insulator.

9. The stator of claim 6, wherein the first obtuse angle is greater than the second obtuse angle.

* * * * *